US007647590B2

(12) United States Patent
Archer et al.

(10) Patent No.: US 7,647,590 B2
(45) Date of Patent: Jan. 12, 2010

(54) PARALLEL COMPUTING SYSTEM USING COORDINATOR AND MASTER NODES FOR LOAD BALANCING AND DISTRIBUTING WORK

(75) Inventors: Charles J. Archer, Rochester, MN (US); Timothy J. Mullins, Rochester, MN (US); Joseph D. Ratterman, Rochester, MN (US); Albert Sidelnik, St. Paul, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 11/469,107

(22) Filed: Aug. 31, 2006

(65) Prior Publication Data

US 2008/0059555 A1 Mar. 6, 2008

(51) Int. Cl.
*G06F 9/46* (2006.01)
(52) U.S. Cl. .................. 718/100; 718/104; 718/105; 709/226
(58) Field of Classification Search ............. 718/100, 718/101, 102, 103, 104, 105, 106; 709/201, 709/203, 226, 218, 219; 713/200; 712/200
See application file for complete search history.

(56) References Cited

U.S. PATENT DOCUMENTS

2003/0055913 A1* 3/2003 Harkin et al. ............... 709/218
2003/0229801 A1* 12/2003 Kouznetsov et al. ........ 713/200
2005/0010653 A1* 1/2005 McCanne .................... 709/219
2005/0182838 A1* 8/2005 Sheets et al. ................ 709/226
2006/0167966 A1 7/2006 Kumar et al.
2007/0011331 A1* 1/2007 Morimoto et al. ........... 709/226
2007/0094481 A1* 4/2007 Snook et al. ................ 712/200
2007/0124474 A1* 5/2007 Margulis ..................... 709/226
2007/0245352 A1* 10/2007 Ma ............................. 718/105

OTHER PUBLICATIONS

Aida et al., "Distributed Computing with Hierarchical Master-worker Paradigm for Parallel Branch and Bound Algorithm", pp. 1-8, Sep. 2003.
Afgan, "Role of the Resource Broker in the Grid", pp. 299-300, XP-002468793, Apr. 2004.
Berstis, IBM Redbooks Paper, "Fundamentals of Grid Computing", pp. 1-28, 2002.
"Design and Implementation of a One-Sided Communication Interface for the IBM eServer Blue Gene Supercomputer", http://sc06.supercomputing.org/techprogram/papers.php/, publicly available Aug. 2006.

* cited by examiner

*Primary Examiner*—Le Luu
(74) *Attorney, Agent, or Firm*—Patterson & Sheridan, LLP (57) ABSTRACT

Embodiments of the invention provide a method, system and article of manufacture for parallel application load balancing and distributed work management. In one embodiment, a hierarchy of master nodes may be used to coordinate the actions of pools of worker nodes. Further, the activity of the master nodes may be controlled by a "coordinator" node. A coordinator node may be configured to distribute work unit descriptions to the collection of master nodes. If needed, embodiments of the invention may be scaled to deeper hierarchies.

24 Claims, 7 Drawing Sheets

PARALLEL COMPUTING SYSTEM USING COORDINATOR AND MASTER NODES FOR LOAD BALANCING AND DISTRIBUTING WORK

BACKGROUND OF THE INVENTION

1. Field of the Invention

The present invention generally relates to data processing. More specifically, the present invention relates to a process for parallel application load balancing and distributed work management in parallel computer systems.

2. Description of the Related Art

One approach to developing very powerful computer systems is to design highly parallel systems where the processing activity of thousands of processors may be coordinated to perform computing tasks. These systems have proved to be highly useful for a broad variety of applications including, financial modeling, hydrodynamics, quantum chemistry, astronomy, weather modeling and prediction, geological modeling, and prime number factoring, to name but a few examples.

One family of parallel computing systems has been (and continues to be) developed by International Business Machines (IBM) under the name Blue Gene. The Blue Gene/L system is a scalable system, and currently Blue Gene/L systems have been configured with as many as 65,536 ($2^{16}$) compute nodes. Each compute node includes a single application specific integrated circuit (ASIC) with 2 CPU's and memory. The Blue Gene architecture has been extremely successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites world-wide were among 5 out of the 10 top most powerful computers in the world.

IBM is currently developing a successor to the Blue Gene/L system, named Blue Gene/P. Blue Gene/P is expected to be the first computer system to operate at a sustained 1 petaflops (1 quadrillion floating-point operations per second). Like the Blue Gene/L system, the Blue Gene/P system is a scalable system with a planned system having 73,728 compute nodes. Each Blue Gene/P node includes a single application specific integrated circuit (ASIC) with 4 CPU's and memory. A complete Blue Gene/P system is projected to include 72 racks with 32 node boards per rack.

In addition to the Blue Gene architecture developed by IBM, other computer systems may have similar architectures or otherwise provide a parallel architecture using hundreds, thousands or even hundreds of thousands of processors. Other examples of a parallel computing system include clustered systems and grid based systems. For example, the Beowulf cluster is one well known clustering architecture. A Beowulf cluster is a group of computer systems each running a Unix-like operating system (typically a version of the Linux® or BSD operating systems). Nodes of the cluster are connected over high speed networks and have libraries and programs installed which allow processing to be shared among one another. Essentially, the processing power of multiple commodity computer systems is chained together to function cooperatively. Libraries such as the Message Passing Interface (MPI) library may be used for node-to-node communications. MPI provides a standard library for communication among the nodes running a parallel program on a distributed memory system. MPI implementations consist of a library of routines that can be called from Fortran, C, C++ and Ada programs. Further, computer systems are available that provide support for symmetric multi processing (SMP) using multiple CPUs in a single system, and single CPUs are available with multiple processing cores.

Each of these architectures allows for parallel computing. Generally, parallel computing refers to a process of executing a single task on multiple processors to obtain results more quickly. Parallel computing techniques typically solve a problem by dividing a large problem into smaller tasks which may be executed simultaneously in a coordinated manner. For example, a common design pattern encountered in parallel computing problems is performing essentially the same calculations or operations for different data sets or work units. For these types of applications, a master node may divide a problem into individual work units and distribute the work units to a collection of worker nodes. Each worker node then performs the appropriate operations on the work units assigned to that node. Because tens, hundreds, or thousands of nodes are performing the same calculations (on different data sets), extremely large datasets may be processed in a relatively short period of time. Many software programs have been developed that use this master/worker paradigm, whether used in supercomputing applications developed for a Blue Gene or similar system, or for applications developed for clusters, multi-processor SMP systems or multi-core processors.

The idea behind the master/worker design pattern is that one node is designated as the "master" node, and other nodes are designated as workers. The master generates work units and distributes them to the worker pool. In turn, an available (or selected) worker node consumes the work unit. Depending on the workload, there are several strategies for workload distribution. Among the most common are round-robin or next available strategies.

The master/worker approach is an excellent technique for developing programs to run in a parallel environment. However, this approach does not scale well when the master node must coordinate and manage the activity of large numbers of worker nodes. Depending on the work load, the generation of work units by the master can easily become a bottleneck in completing a computing task, as many workers may sit idle waiting for work units to be assigned or made available. For example, depending on the problem, the master node may take a long time to generate a work unit relative to the time it takes a worker unit to process one. In this case, a high master to worker ratio is required. At the worker end of the master/worker paradigm, when the time required to consume a work unit is very small, the overhead of producing an adequate supply of work units can become a bottleneck on overall system performance. In this case, a high master to worker ratio is also required. However, the nodes used as master nodes may be unavailable for work unit consumption, leading to system inefficiency.

Further, if the time required for a node to process a work unit takes a variable amount of time to complete, there can be a skew in the finishing time for all the workers. Near the end of a computing task, some nodes may be idle, and others still consuming work units. Given the number of nodes in highly parallelized super systems or large clusters and grids, operations that require even small amounts of idle time for any individual node often translate into large amounts of time for the system as a whole. One approach in such a situation is to divide the work units into smaller chunks so they are more evenly distributed. However, this division puts more stress on the master node, which as described, leads to bottlenecks in system performance. Due to these factors, the master/worker paradigm can lead to poor use of resources in some cases.

Accordingly, there is a need in the art for techniques for parallel application load balancing and distributed work management in a parallelized computer system.

SUMMARY OF THE INVENTION

Embodiments of the invention provide a master/worker paradigm for parallel computing applications that eliminates the bottleneck of a single master without reducing the work imbalance created by the use of large work units.

One embodiment of the invention provides a method of performing a parallel computing task. The method may generally include generating, by a coordinator node, a plurality of work unit descriptions, wherein each description includes metadata describing a work unit to be performed as part of the parallel computing task and distributing, by the coordinator node, the work unit descriptions to at least one master node, wherein each master node is configured to generate work units from the work unit descriptions and further configured to manage the distribution of work units to a pool of one or more worker nodes. The method may generally further include distributing, by the master node, the work units to the pool of worker nodes, wherein a worker node in the pool is configured to process the work units distributed to the worker node.

Another embodiment of the invention provides a computer-readable medium containing a program which, when executed, performs an operation of performing a parallel computing task. The operations may generally include generating, by a master node, work units from work unit descriptions, each description having been generated by a coordinator node and including metadata describing a work unit to be performed as part of the parallel computing task, and distributing, by the master node, the work units to a pool of worker nodes, wherein a worker node in the pool is configured to process the work units distributed to the worker node.

Still another embodiment of the invention provides a system configured to perform a parallel computing task. The system may generally include a coordinator node configured to generate a plurality of work unit descriptions, wherein each description includes metadata describing a work unit to be performed as part of the parallel computing task and to distribute the work unit descriptions to at least one master node. The system may further include a master node configured to generate a work unit, from the work unit descriptions generated by the coordinator node and further configured to distribute the work units to a worker node and a pool of worker nodes, wherein a worker node is configured to process work units distributed to the worker node.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide a method for parallel application load balancing and distributed work management. In one embodiment, a hierarchy of master nodes may be used to coordinate the actions of pools of worker nodes. Further, the activity of the master nodes may be controlled by a "coordinator" node. A coordinator node may be configured to distribute work unit descriptions to the collection of master nodes. If needed, embodiments of the invention may be scaled to deeper hierarchies. For example, a master coordinator may be used to coordinate the activity of a group of coordinator nodes (which in turn manage a group of masters, which themselves manage a pool of worker nodes). At higher levels of the hierarchy, the data package managed by a node is simplified, thus the volume may be larger without creating a bottleneck. For example, the coordinator node may be configured to process work unit descriptions (i.e., metadata describing a work unit), where the master nodes generate the actual work units from the work unit descriptions. Thus, the coordinator node may process many more work unit descriptions, relative to the number of work units a master node could process in the same time.

Embodiments of the invention are described herein with respect to the Blue Gene computer architecture developed by IBM. Embodiments described herein are advantageous for massively parallel computer systems that include thousands of processing nodes, such as a Blue Gene system. However, embodiments of the invention may be adapted for use in a variety of parallel computer systems that employ multiple CPUs arranged to communicate over a network. For example, embodiments of the invention may be readily adapted for use in distributed architectures such as clusters or grids. In such architectures, each processing node may be a computer system communicating with others over local, regional, or global networks. Further, embodiments of the invention may be adapted for use with multi-threaded SMP systems or for systems with multiple processing cores.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
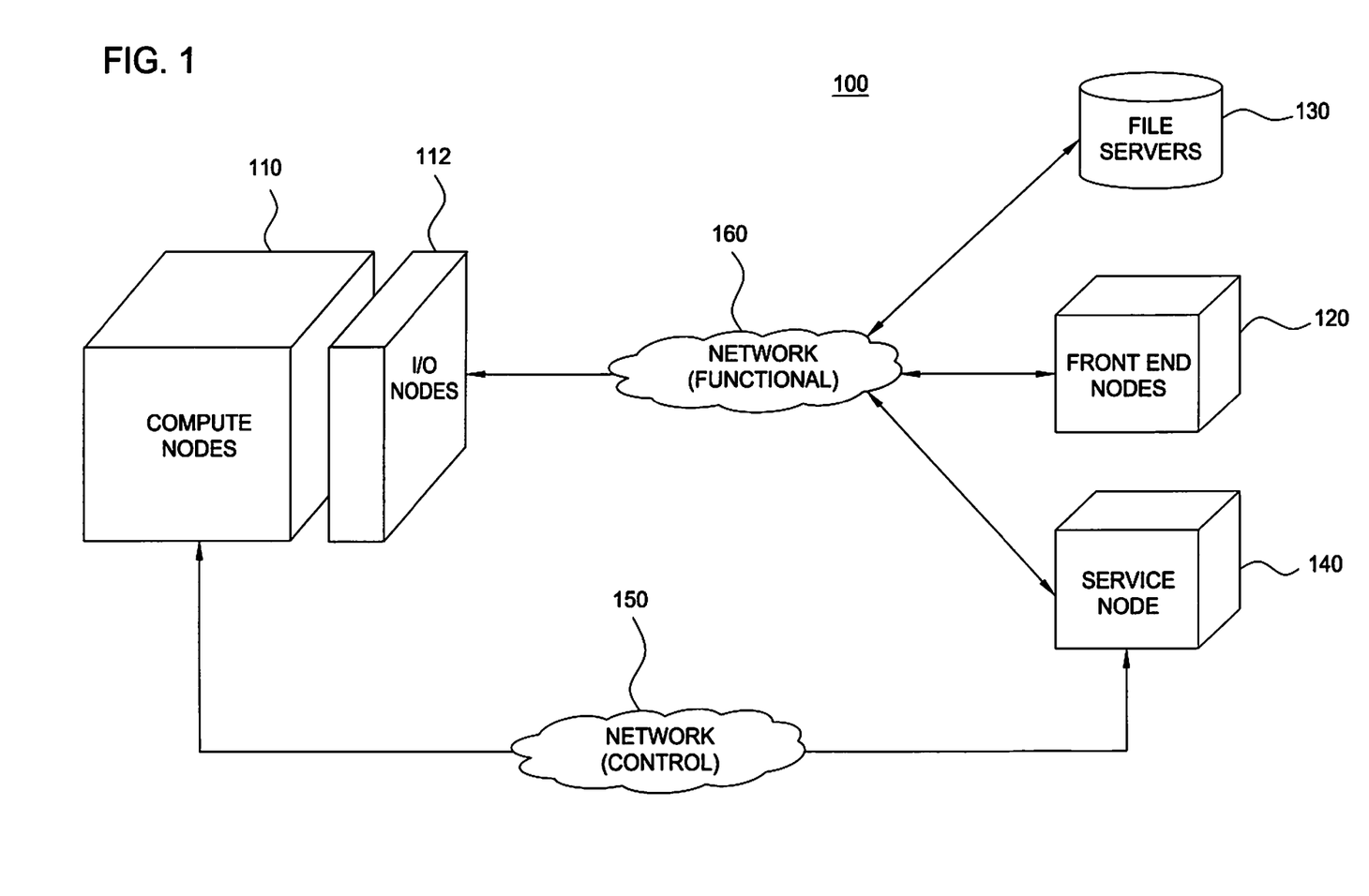
FIG. 1 is a block diagram illustrating a massively parallel computer system, according to one embodiment of the invention.

FIG. 1 is a block diagram illustrating a highly parallel computer system 100, according to one embodiment of the invention. In particular, computer system 100 provides a simplified diagram of a Blue Gene system. However, system 100 is representative of other massively parallel architectures. As shown, the computer system 100 includes a collection of compute nodes 110 and a collection of input/output (I/O) nodes 112. The compute nodes 110 provide the computational power of the computer system 100. Each compute node 110 may include one or more central processing units (CPUs). Additionally, each compute node 110 may include volatile memory used to store program instructions and data sets (i.e., work units) on which the program instructions are performed. In one embodiment, a compute node 110 may be configured to perform the functions of a master node or a worker node.

When configured as a master node, a compute node 110 may control the work units assigned to and processed by a collection of worker nodes. In turn, when configured as a worker node, a compute node 110 may be configured to receive work units from its master node and to return any results from processing a work unit back to its master node. Note, however, other than the operational use as a "worker" node or "master" node, the compute nodes 110 may be generally indistinguishable from one another within the overall collection of compute nodes 110 in system 100.

Additionally, as described in greater detail herein, one or more compute nodes 110 may be configured as a "coordinator" node. When configured as a "coordinator" node, a compute node 110 may control a group of one or more master nodes. By introducing a hierarchical structure to the master/worker paradigm, embodiments of the invention may eliminate the performance bottlenecks inherent to a single master/multiple worker system, without having to concomitantly increase work unit size (leading to poor system utilization). Further, a hierarchical structure may reduce the number of compute nodes 110 required to be configured as "master" nodes, leading to improved overall system utilization, as more compute nodes 110 may be configured as workers used to process work units.

I/O nodes 112 provide a physical interface between the compute nodes 110 and file servers 130 over functional network 160. In one embodiment, the compute nodes 110 and I/O nodes 112 communicate with file servers 130, front end nodes 120 and service node 140 over both a control network 150 and/or a functional network 160. In a Blue Gene system, the I/O nodes 112 and compute nodes 110 may differ from one another only by which network interfaces are enabled and how the node is used by the system 100. The I/O nodes 112 may also be configured to execute processes that facilitate the booting, control, job launch and debug of the computing system 100. By relegating these functions to the I/O nodes 112, an operating system kernel running on each compute node 110 may be greatly simplified as each compute node 110 is only required to communicate with a few I/O nodes 112. The front end nodes 120 store compilers, linkers, loaders and other applications used to interact with the system 100. Typically, users access front end nodes 120, submit programs for compiling, and submit jobs to the service node 140.

The service node 140 may include a system database and a collection of administrative tools provided by the system 100. Typically, the service node 140 includes a computing system configured to handle scheduling and loading of software programs and data on the compute nodes 110. In one embodiment, the service node may be configured to assemble a group of compute nodes 110 (referred to as a block), and dispatch a job to a block for execution. The service node 140 is typically a computer system that includes an operating system, memory, storage, and control console (not shown). For example, compute nodes on Blue Gene systems use an operating system similar to the Linux® operating system. The service node 140 communicates with the compute nodes 110 over control network 150. The control network 150 provides a communication channel for the service node 140 to control aspects of the operation of system 100.

In one embodiment, the service node 140 may assemble a block to execute a parallel application. In turn, a collection of compute nodes 110 may be configured to form a hierarchy of coordinator nodes, master nodes, and worker nodes to process a computing job.

Figure 2:
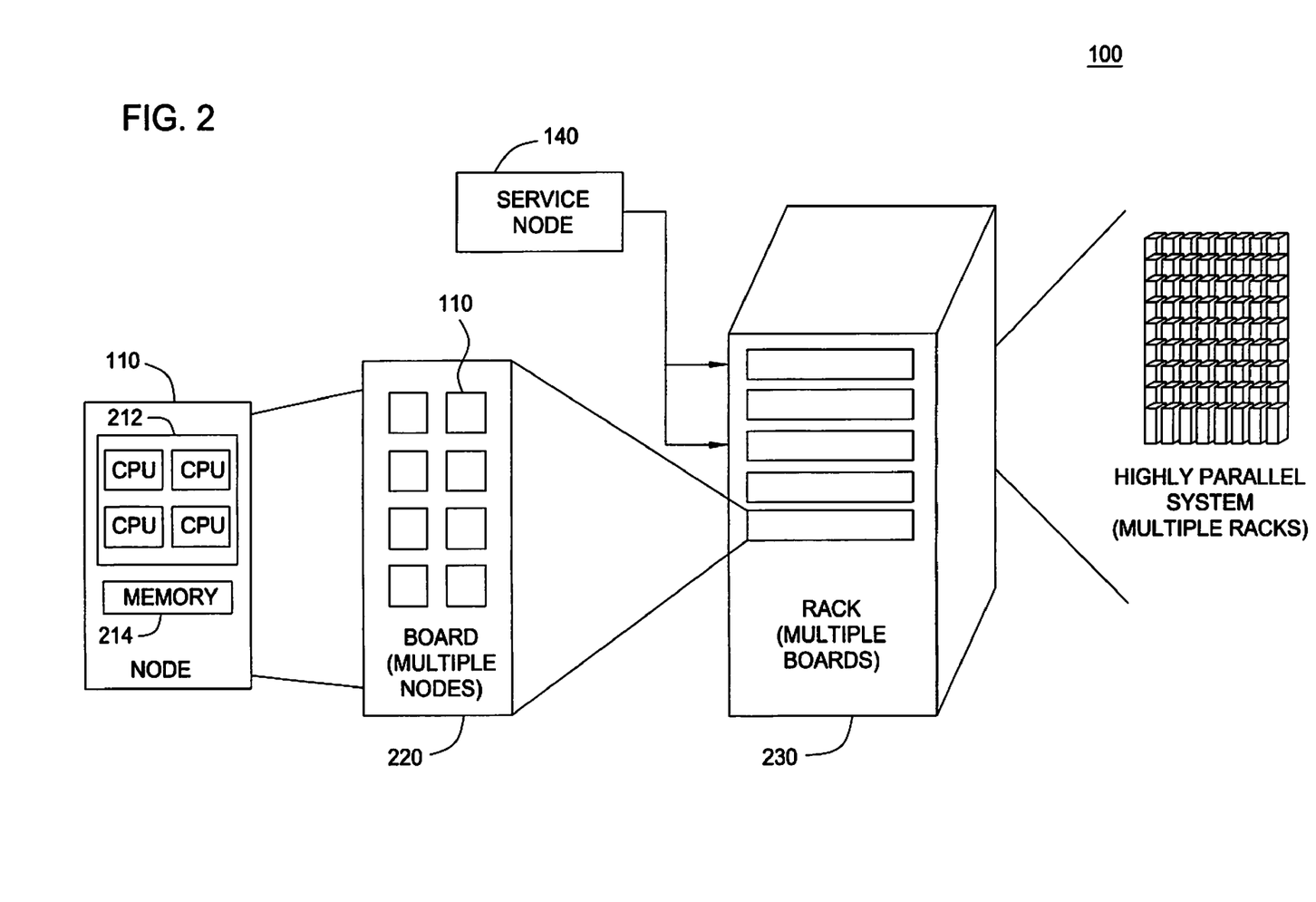
FIG. 2 is a block diagram that further illustrates aspects of a massively parallel computer system, according to one embodiment of the invention.

FIG. 2 is a block diagram further illustrating aspects of a massively parallel computer system, according to one embodiment of the invention. In particular, FIG. 2 shows a block diagram that illustrates aspects of the Blue Gene/P computer system. As stated above, the Blue Gene/P is a scalable system with a projected maximum of 73,728 compute nodes 110. In a Blue Gene/P system, each compute node 110 is packaged on a node card and consists of an application specified integrated circuit (ASIC) 212 with four CPUs and memory 214. A node board 220 accommodates 32 node cards, each having a node 110. Thus, each node board has 32 nodes, with 4 CPUs per node 110 and memory 214. A rack 230 is a housing that holds 32 node boards 220. A complete Blue Gene/P system would be housed in 72 racks 130 with 32 node boards 220 in each rack. Thus, a complete Blue Gene/P system would have a maximum of 294,912 CPUs (72 racks× 32 node boards×32 nodes×4 CPUs).

The Blue Gene/P computer system includes multiple data communication networks. An I/O processor located on some node boards 220 process data communication between service node 140 and a group of compute nodes 110. In one embodiment, each I/O node 112 manages data communications over functional network 160 for as many as 1024 compute nodes 110. In a Blue Gene/P system, the 73,728 compute nodes 110 and 1024 I/O nodes are configured to communicate over both a logical tree network and a torus network. The torus network connects the compute nodes 110 in a lattice like structure that allows each compute node 110 to communicate directly with its six nearest neighbors. Two neighbors in each of an "x," "y," and "z" plane. The "last" node in any plane maps wraps the connection back to the "first" node, hence the description of a "torus" network. Nodes 110 may communicate over the torus network using the well known Message Passing Interface (MPI), an application programming interface used in developing applications for a highly parallel or cluster computer system (e.g., system 100). Any one compute node 110 may route messages to another compute node 110 over the torus network. In one embodiment, a message passing network (e.g., the torus network of a Blue Gene system) may be used by a coordinator node to distribute work unit descriptions to a pool of master nodes, which in turn generate work units distributed to pools of worker nodes.

Figure 3:
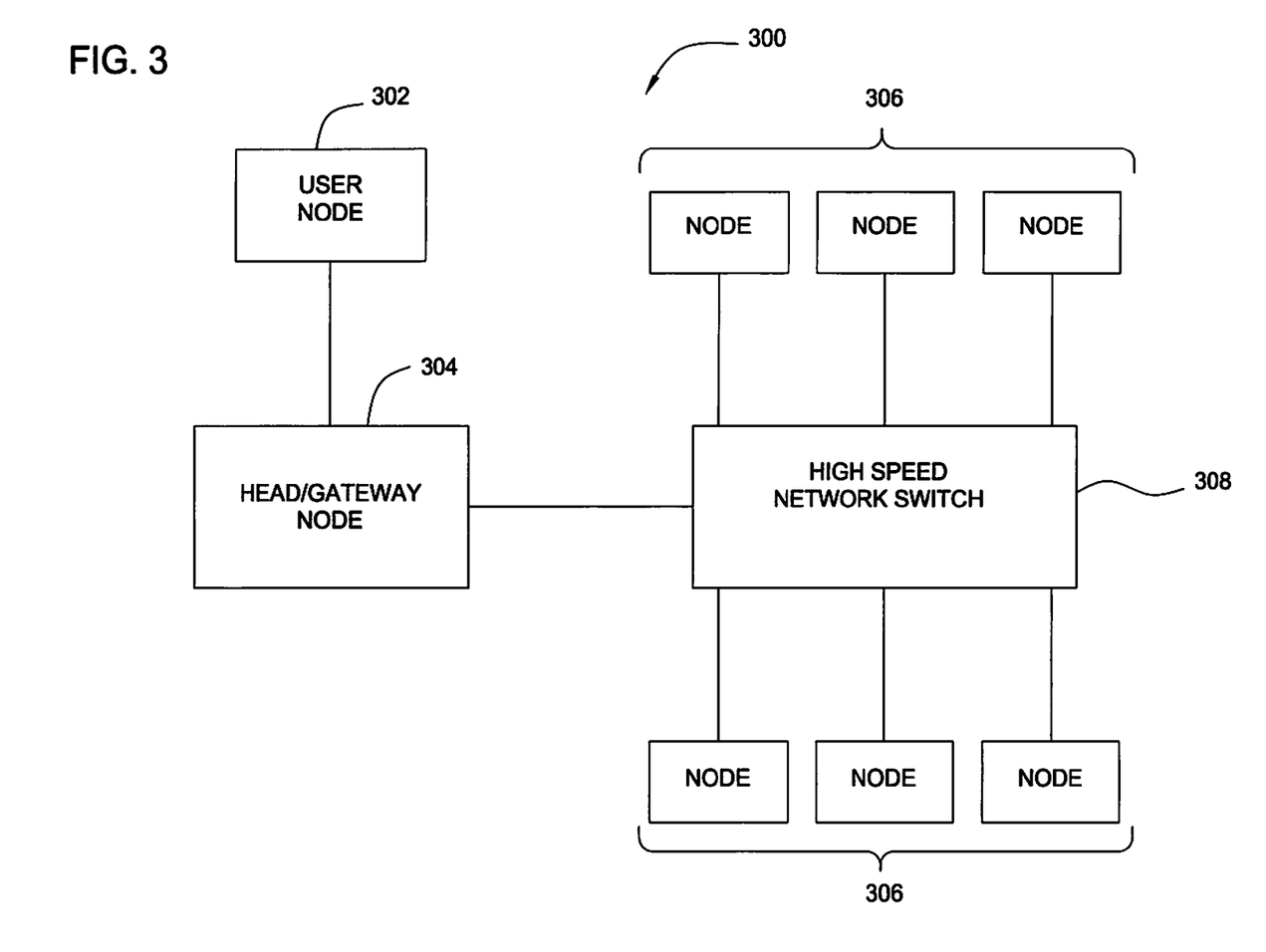
FIG. 3 illustrates another example of a parallel architecture, according to one embodiment of the invention.

FIG. 3 illustrates another example of a parallel architecture, according to one embodiment of the invention. Cluster 300 is representative of a Beowulf cluster, as well as other clustering architectures. As shown, cluster 300 includes a user node 302, gateway nodes 304, compute nodes 306 connected via high-speed network switch 308. Those skilled in the art will recognize that FIG. 3 provides a simplified representation of a computing cluster, and that a typical computing cluster includes a number of additional elements.

User node 302 may provide an interface to cluster 300. As such, user node 302 allows users to create, submit, and review the results of computing tasks submitted for execution to cluster 300. As shown, user node 302 is connected to head/ gateway node 304. Head/gateway node 304 connects the user node 302 to the compute nodes 306. Compute nodes 306 provide the processing power of cluster 300. As is known, clusters are often built from racks of commonly available PC components. Thus, each node 306 may include one or more CPUs, memory, hard disk storage, a connection to high speed network switch 308, and other common PC components.

Like the compute nodes 110 of parallel system 100, a compute node 306 of cluster 300 may be configured to perform the functions of a master node or a worker node. When configured as a master node, a compute node 306 may control the work units assigned to and processed by a collection of worker nodes. In turn, when configured as a worker node, a compute node 306 may be configured to receive work units from its master node and to return any results from processing a work unit back to its master node. Note, however, other than the operational use as a "worker" node or "master" node, the compute nodes 306 may be generally indistinguishable from one another within the overall collection of compute nodes 306 in cluster 300. Additionally, one or more compute nodes 306 may be configured as a "coordinator" node. When configured as a "coordinator" node, a compute node 306 may generate work unit descriptions for a group of one or more master nodes.

Figure 4:
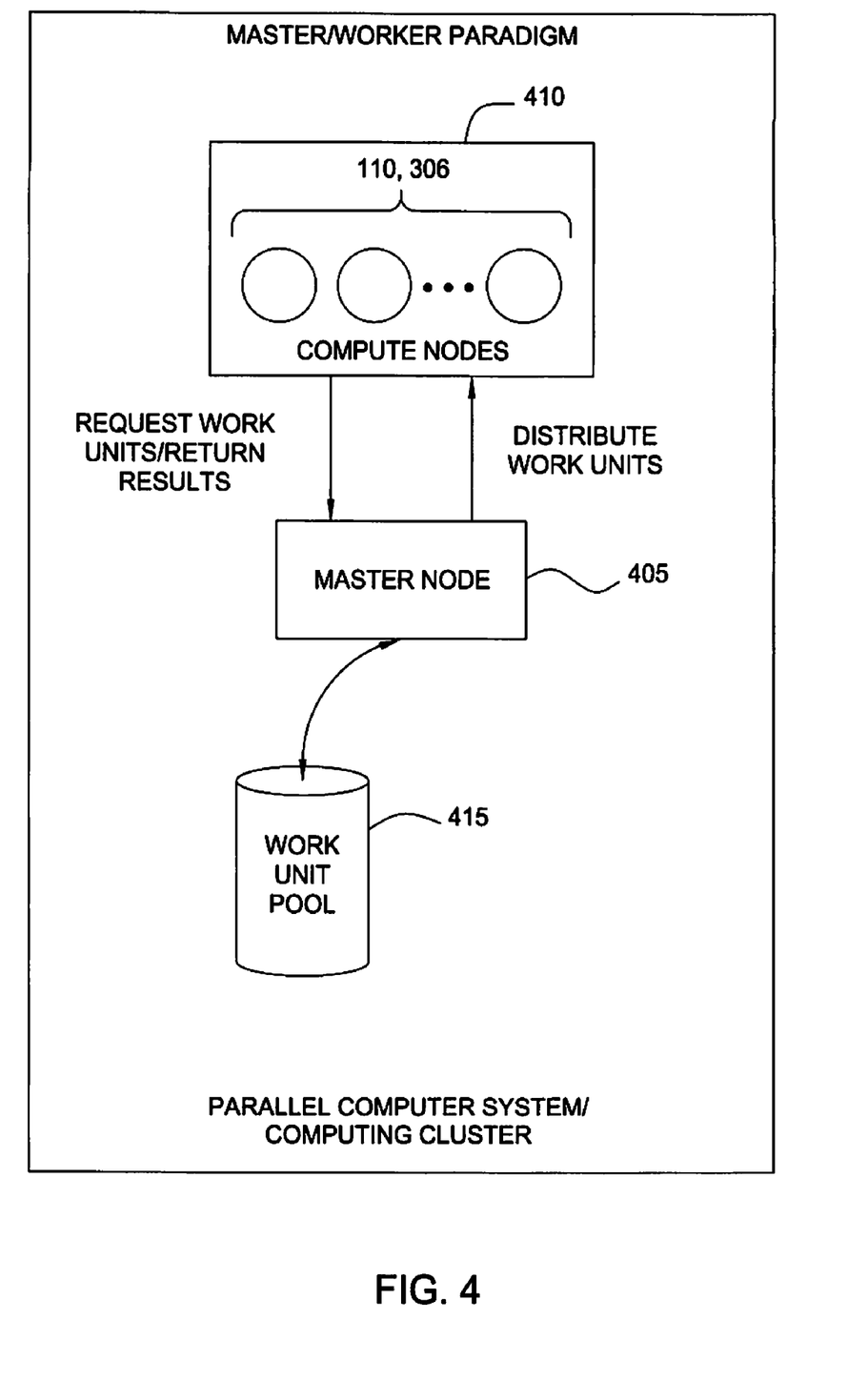
FIG. 4 is a block diagram illustrating the interaction between a pool of worker nodes and a master node, according to one embodiment of the invention.

FIG. 4 is a block diagram illustrating the interaction between a pool of worker nodes 410 and a master node 405, according to one embodiment of the invention. As shown, master node 405 may access work unit pool 415 to generate a work unit. Depending on the underlying architecture, the master node 405 may be a compute node 110 of a massively parallel computer system (e.g., system 100), a node 306 of a cluster (e.g., cluster 300) or a processor or processing core in an SMP system. In any case, master node 405 may be configured to generate a work unit, and distribute it to the worker pool 410. In turn, an available (or selected) worker node (110, 306) in work node pool 410 consumes the work unit and passes any results back to the master node 405.

Figure 5:
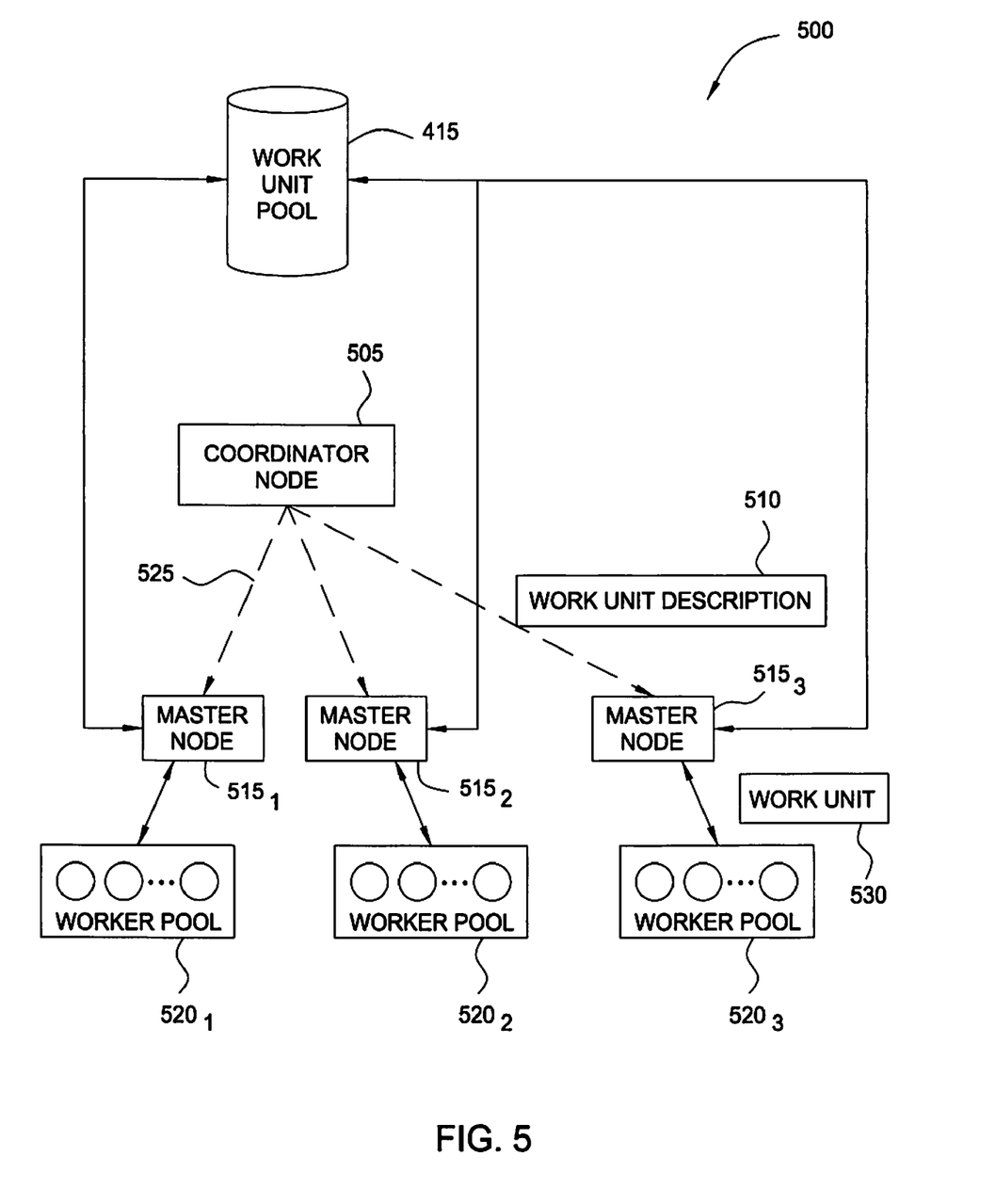
FIG. 5 further illustrates the interaction between a pool of worker nodes and a master node, according to one embodiment of the invention.

FIG. 5 further illustrates the interaction between a pool of worker nodes 410 and a master node 405. Specifically, FIG. 5 illustrates a configuration 500 of a collection of compute nodes for parallel application load balancing and distributed work management, according to one embodiment of the invention. As shown, master nodes $515_1$-$515_3$ are part of a hierarchy of nodes used to manage the compute nodes included in worker node pools $520_1$-$520_3$. Each master node $515_1$-$515_3$ manages a corresponding pool 520 of worker nodes. In turn, master nodes $515_1$-$515_3$ are managed by a coordinator node 505.

Work unit pool 415 stores the work to be done in as part of a computing job. For example, in CGI rendering and animation, work unit pool 415 might contain descriptions of three dimensional graphic scenes for thousands of animation frames. In such a case, coordinator node 505 may include metadata about the work unit pool 415, for example, the number of frames to render from a given scene contained in the work unit pool 415. In one embodiment, coordinator node 505 may be configured to distribute work unit descriptions 510 to the master nodes 515. The work unit description 515 may be very lightweight and describe details such as "where to get data", "how much data to get," among other things. This is represented by the light dashed arrows 525. Accordingly, coordinator node 505 can process a larger volume of "work Descriptions" relative to the number of "work units" processed by master nodes 515, in a similar time period.

Continuing through the hierarchy, the second tier includes master nodes 515. Each master node 515 controls the processing performed by a set of worker nodes in one of the worker pools 520. The master nodes are logically distributed throughout the worker pool. For example, in one particular configuration of a Blue Gene/L system, every set of 64 compute nodes is part of a pool 520 (with 63 worker nodes) controlled by one of the master node 515. In this configuration, sets of 64 compute nodes are organized into blocks of 8×4×2 nodes, however, on other systems, the master nodes 515 can be distributed in other ways.

As stated, master nodes 515 may receive work unit descriptions 510 from coordinator node 505. Using these descriptions, master nodes 515 construct work units 530. Creating work units 530 is typically a "heavier" process than the creating work unit descriptions 510. For example, generating a work unit may include fetching data from the work unit pool 415, processing the data to create a distributable work unit 530, and distributing the work units 530 to worker pool 520. Hence, the coordinator distributes this "heavier" workload across multiple master nodes 515. By creating lightweight work unit descriptions 510, a single coordinator 505 does not create a bottleneck, even though it processes the metadata for the entire set of work units 415. On very large systems, the workflow hierarchy illustrated in FIG. 5 may be extended. For example, multiple coordinators 505 could be managed by a "master coordinator", which itself may distribute metadata about the work unit descriptions 510, leading to a hierarchy of coordinator nodes.

Coordinator node 505 has a "global" view of the work distribution. If one master node 515 distributes work units 530 that take less time to process than other master nodes 515, there can be a load imbalance because the workload of the one master node 515 finishes before the other. In one embodiment, coordinator node 505 may be configured to recognize this situation and to adaptively change the distribution of the work unit descriptions 515 to obtain a more fully utilized system. The ability to distribute the master work load among multiple master nodes 515 improves both system throughput and utilization as the master nodes do not become a bottleneck, even when work units 530 requires significant time or resources to generate. Further, even where one master node 515 is saturated with work requests, coordinator node 515 may maintain a balance of system utilization across the collective group of master nodes. In other words, embodiments of the invention allows for the distribution of work requests among multiple master nodes 515, with the coordinator node 505 controlling the flow of work to ensure proper load balancing.

Work units can remain more granular, creating better load balance without the consequence of swamping a single master node. In other words, because the production of work units can be distributed, finer grained work units may be used without over-taxing the master node. Further work units are distributed more evenly throughout the system, leading to better load balance.

Figure 6:
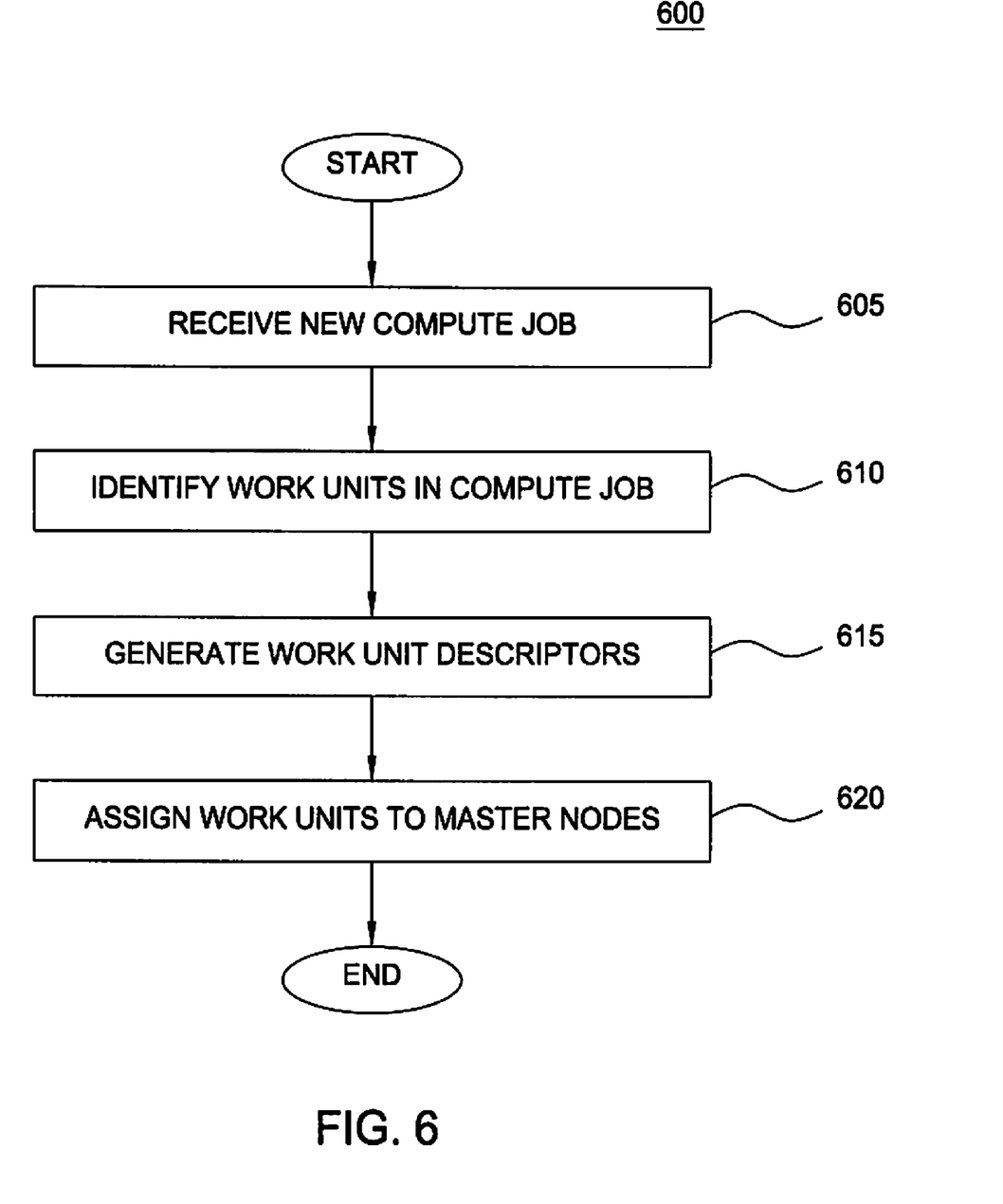
FIGS. 6 and 7 illustrate a method for parallel application load balancing and distributed work management, according to one embodiment of the invention.
Figure 7:
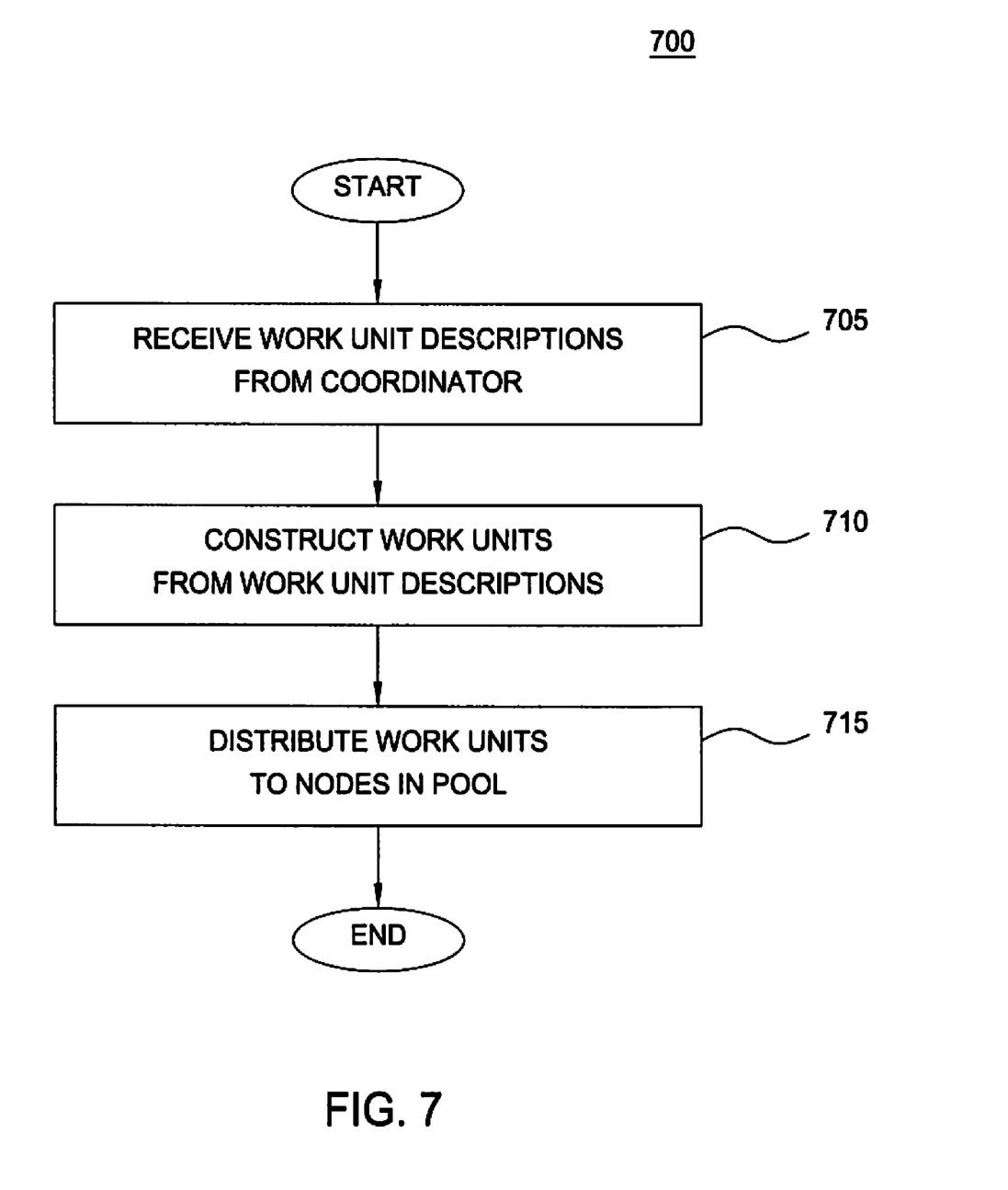

FIGS. 6 and 7 illustrate a method for performing a parallel computing task, according to one embodiment of the invention. First, FIG. 6 illustrates a method 600 of the operations of a coordinator node in dispatching work unit descriptions to one or more master nodes. As shown, the method 600 begins at step 605 where a coordinator node receives a new computing job. At step 610, the coordinator may identify work units associated with the computing job recited at step 605. For example, the work units may include thousands (or more) data sets each of which is ultimately processed by a worker node as part of the computing task.

At step 615, the coordinator may generate work unit descriptions that describe characteristics of each work unit. As stated above, work unit descriptions may be very lightweight and describe details such as "where to get data" and "how much data to get," for a given work unit. At step 620, the coordinator node may distribute the work unit descriptions to a group of one or more master nodes. Once work unit descriptions are distributed to the master nodes, the coordinator node may monitor the processing of the work unit descriptions by the master nodes. If, for example, one of the nodes is processing work unit descriptions more quickly than others, then the coordinator node may distribute more descriptions to that node. Conversely, if one of the master nodes is lagging behind others, work unit descriptions may be rerouted to other master nodes, or no new descriptions given to that master node until that node catches up.

FIG. 7 illustrates a method 700 of the operations of one or more master nodes dispatching work units to one or pools of worker nodes, according to one embodiment of the invention. As shown, the method begins at step 705 where a master node (or nodes) receives work unit descriptions from the coordinator node. At step 710, the master node constructs work units from the work unit descriptions received at step 705. At step 715, the work units generated at step 710 are distributed to a pool of worker nodes managed by that master node. Thus, as each master node manages a pool of one or more worker nodes, a coordinator node manages a pool of master nodes. Moreover, at each level of the hierarchy, the work packages processed by node(s) at that level become more "lightweight." For example, as described above, the worker nodes may be configured to actually retrieve and process data as specified by a work unit. This is the "heaviest" activity of the hierarchy. At the same time, a master node generates work units processed by the worker nodes, and the coordinator node processes only descriptions of a work unit. Further, the hierarchy for parallel application load balancing and distributed work management described herein may be extended to an arbitrary depth.

While the foregoing is directed to embodiments of the present invention, other and further embodiments of the invention may be devised without departing from the basic scope thereof, and the scope thereof is determined by the claims that follow.

What is claimed is:

1. A method of performing a parallel computing task on a parallel computing system having a plurality of compute nodes, each compute node having at least a processor and a memory, the method comprising:
    generating, by a coordinator node, of the plurality of compute nodes, a plurality of work unit descriptions, wherein each description includes metadata describing a work unit to be performed as part of the parallel computing task;
    distributing, by the coordinator node, the work unit descriptions to at least one master node, of the plurality of compute nodes;
    generating, by the master node, one or more work units from each work unit description, wherein the master node is configured to manage distribution of the work units to a pool of one or more worker nodes, of the plurality of compute nodes;
    distributing, by the master node, the work units to the pool of worker nodes, wherein each worker node in the pool is configured to process the work units distributed to that worker node.

2. The method of claim 1, wherein the parallel computer system is a Blue Gene computer system.

3. The method of claim 1, wherein the coordinator node, the master node, and the worker node are each compute nodes of a computing cluster, wherein the cluster is a Beowulf cluster.

4. The method of claim 1, wherein the coordinator node, the master node, and the worker node are each processors in a symmetric multi-processing system (SMP).

5. The method of claim 1, further comprising, configuring a master coordinator node to manage work unit descriptions generated by a plurality of coordinator nodes.

6. The method of claim 1, wherein the coordinator node is further configured to monitor the work unit generation performed by a plurality of master nodes and to adjust the distribution of work unit descriptions based on the performance of the plurality of master nodes.

7. The computer-implemented method of claim 1, wherein the metadata describing each work unit to be performed as part of the parallel computing task includes an indication of a location of data and an amount of data to be retrieved in order to process the work unit.

8. The computer-implemented method of claim 1, further comprising, receiving, from the plurality of worker nodes, the results from processing the plurality of work units as output of the parallel computing task.

9. A computer-readable storage medium containing a program which, when executed, performs an operation of performing a parallel computing task on a parallel computing system having a plurality of compute nodes, each compute node having at least a processor and a memory, the operation comprising:

generating, by a master node of the plurality of compute nodes, work units from work unit descriptions, each description having been generated by a coordinator node, of the plurality of compute nodes, and including metadata describing a work unit to be performed as part of the parallel computing task;

distributing, by the master node, the work units to a pool of worker nodes, of the plurality of compute nodes, wherein each worker node in the pool is configured to process the work units distributed to that worker node in parallel with the work units distributed to other worker nodes in order to perform the parallel computing task.

10. The computer-readable storage medium of claim 9, wherein the massively parallel computer system is a Blue Gene computer system.

11. The computer-readable storage medium of claim 9, wherein the coordinator node, the master node, and the worker node are each compute nodes of a computing cluster, wherein the cluster is a Beowulf cluster.

12. The computer-readable storage medium of claim 9, wherein the coordinator node, the master node, and the worker node are each processors in a symmetric multi-processing system (SMP).

13. The computer-readable storage medium of claim 9, wherein the operation further comprises, configuring a master coordinator node to manage work unit descriptions generated by a plurality of coordinator nodes.

14. The computer-readable storage medium of claim 9, wherein the coordinator node is further configured to monitor the work unit generation performed by a plurality of master nodes and to adjust the distribution of work unit descriptions based on the performance of the plurality of master nodes.

15. The computer-readable storage medium of claim 9, wherein the metadata describing each work unit to be performed as part of the parallel computing task includes an indication of a location of data and an amount of data to be retrieved in order to process the work unit.

16. The computer-readable storage medium of claim 9, wherein the operation further comprises receiving, from the plurality of worker nodes, the results from processing the plurality of work units as output of the parallel computing task.

17. A parallel system computing configured to perform a parallel computing task, comprising:

a plurality of compute nodes, each having at least a processor and a memory, wherein the plurality of compute nodes includes at least:

a coordinator node configured to generate a plurality of work unit descriptions, wherein each description includes metadata describing a work unit to be performed as part of the parallel computing task and to distribute the work unit descriptions to at least one master node, a master node configured to generate a work unit, from the work unit descriptions generated by the coordinator node and further configured to distribute the work units to a worker node, and a pool of worker nodes, wherein each worker node is configured to process work units distributed to that worker node in parallel with the work units distributed to other worker nodes in order to perform the parallel computing task.

18. The system of claim 17, wherein the massively parallel computer system is a Blue Gene computer system.

19. The system of claim 17, wherein the coordinator node, the master node, and the worker node are each compute nodes of a computing cluster, wherein the cluster is a Beowulf cluster.

20. The system of claim 17, wherein the coordinator node, the master node, and the worker node are each processors in a symmetric multi-processing system (SMP).

21. The system of claim 17, wherein the operation further comprises, configuring a master coordinator node to manage work unit descriptions generated by a plurality of coordinator nodes.

22. The system of claim 17, wherein the coordinator node is further configured to monitor the work unit generation performed by a plurality of master nodes and to adjust the distribution of work unit descriptions based on the performance of the plurality of master nodes.

23. The system of claim 17, wherein the metadata describing each work unit to be performed as part of the parallel computing task includes an indication of a location of data and an amount of data to be retrieved in order to process the work unit.

24. The system of claim 17, wherein the master node is further configure to receive, from the plurality of worker nodes, the results from processing the plurality of work units as output of the parallel computing task.

* * * * *